July 27, 1937.　　　C. L. GAIROARD　　　2,088,197
BRICK AND STONE DRILL
Filed Oct. 7, 1936
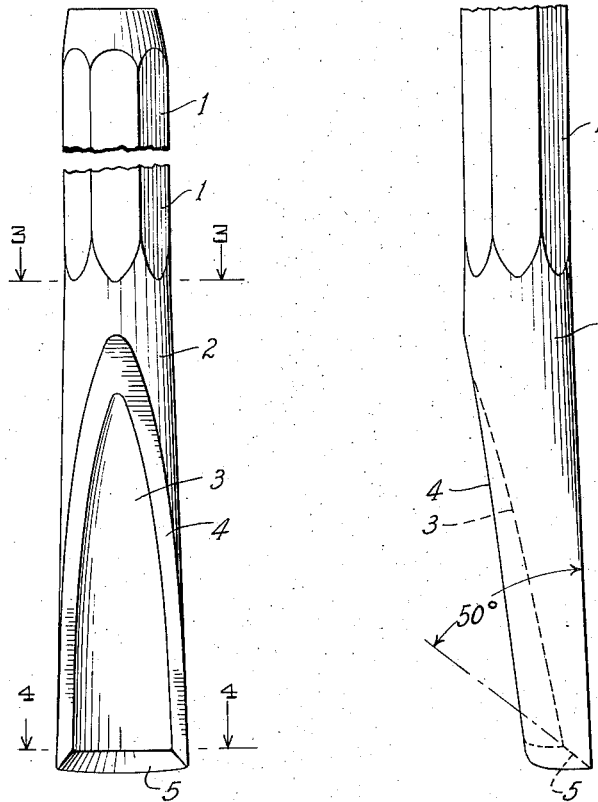
INVENTOR.
Camille L. Gairoard
BY
Wm. J. Herdman
ATTORNEY.

Patented July 27, 1937

2,088,197

UNITED STATES PATENT OFFICE 2,088,197

BRICK AND STONE DRILL

Camille L. Gairoard, West Orange, N. J., assignor to Kraeuter & Company, Inc., Newark, N. J., a corporation of New Jersey Application October 7, 1936, Serial No. 104,447

3 Claims. (Cl. 255—63)

My invention relates to drills for brick, stone, concrete and the like, and pertains in particular to that type of such drills as are operated by percussion.

Drills of the type above referred to as hitherto and now generally used are of two types: those employing a cutting edge in the form of a cross with the center of the cross approximately in the longitudinal axis of the drill, and those employing a tube the cutting edge of which is in the form of sharpened serrations or teeth circumferentially disposed. Both types have serious disadvantages in use. With the first type it is impossible to drill a circular hole or one with a reasonable amount of clearance between the hole and drill, the tendency being for the hole to be much larger than intended. Also, the drill is not adapted to clearing the debris from the hole and the debris packs and causes the drill to wedge and bind. Such drills are also quite difficult to sharpen. The tubular type of drill is also difficult to sharpen and maintain sharp as the teeth break off. This drill also tends to wedge and bind in the hole. Further, the debris accumulates in and clogs the body of the drill to interfere with the effective operation of the drill.

One of the principal objects of my invention comprises producing a brick and stone drill of simple structure which effectively overcomes the above noted disadvantages.

A further object comprises producing a brick and stone drill with which a perfectly round hole having minimum clearance may be produced.

Another object comprises producing a brick and stone drill which will not wedge and bind and is highly efficient and effective.

I accomplish all of the above noted desirable features and results and others which will hereinafter be apparent by means of the novel structure which will hereinafter be more specifically described with reference to the accompanying drawing, forming a part of this specification, in which like reference numerals designate corresponding parts and in which:

Fig. 1 is a front view of my improved drill with the shank broken and shortened;

Fig. 2 is a side view of the same with the shank broken away;

Fig. 3 is a sectional view of the same taken on the line 3—3 of Fig. 1;

Fig. 4 is a sectional view of the same taken on the line 4—4 of Fig. 1;

Fig. 5 is an enlarged sectional view of a portion of the drill bit in operative position in a hole being drilled in concrete or stone; and Fig. 6 is an enlarged top plan view of the showing in Fig. 5 with the drill removed.

Referring now particularly to Figs. 1–4, inclusive, my improved drill comprises a rod preferably of steel or steel alloy suitable for the purpose having a shank portion 1 and a bit portion 2. The bit portion gradually increases in diameter to a maximum at the extremity thereof and is provided with a flattened area 4 which may preferably be formed by means of a milling cutter. The flattened portion has a maximum width and depth at the extremity of the bit portion and decreases, as shown, in width and depth to a minimum near the upper end of the bit portion 2. A substantially circular groove 3 is provided in the bit portion at the flattened area and the longitudinal axis of the groove is so inclined to the longitudinal axis of the drill and of such diameter that the relation of the varying width of the groove 3 with respect to the varying width of the flat portion 4 is such that, as the depth and width of the groove increase from a minimum at a point near the minimum depth of the flat portion toward the extremity of the bit portion, a wall of gradually increasing thickness is provided from the extremity of the bit portion to the top portion thereof as shown in Figs. 1 and 2. The thickness of the extremity of the bit portion is uniform throughout its arcuate extent before this extremity is provided with an internal bevel 5. The bevel 5 provides an arcuate cutting edge in the exterior surface of the bit portion 2 at an angle from 40° to 60° as shown in Fig. 3 with the exterior surface of the bit portion 2.

The arcuate extent of the cutting edge before the corners are rounded off is about one-half the periphery of the extremity of the bit portion. The edges are rounded off as shown in Fig. 1 and the effective cutting edge is preferably greater than one-third and less than one-half the periphery of the extremity of the bit portion. Thus as the drill is rotated between blows, three rotations produce overlapping cuts to provide a closed circular cut.

The shank may be circular, hexagonal, or, as shown, octagonal in cross-section and the surface may be knurled or otherwise roughened to facilitate turning the drill.

In operation my improved drill is extremely effective and efficient. I have successfully demonstrated that the drill cuts only on the circumference of the hole as shown in Figs. 5 and 6, which illustrate the action of the drill in stone and concrete and represent conditions just after the drill has been given a blow in one position.

The arcuate wedge shape of the cutting edge is extremely effective as shown in Figs. 5 and 6 in breaking up the material at the bottom of the hole so that it may be removed and the shape of the bit portion provides an effective scoop for removal of such debris.

I have found that with my improved drill it is possible to cut in brick, stone, concrete and the like a perfectly round hole and one having only slightly more clearance than the circumference of the bit at the cutting edge. I have demonstrated that my improved drill cuts from thirty to thirty-five percent faster than other types of such drills and with much less effort. I have further demonstrated that the drill will not wedge and bind. It is also easier to rotate at the bottom of the hole and requires a much lighter blow than ordinarily necessary. It is also easy to sharpen.

In utilizing my drill, three light starting blows are given to the drill, the drill being turned approximately 120° between each blow. This defines the circumference of the hole and the drill thereafter guides itself. Because of the angle of the arcuate cutting edge there is practically no rebound encountered as the drill is struck as there is in all other types of such drills. Preferably the drill is tempered to a tough hard structure as is usual in such types of drills.

While I have shown and described, by way of example only, one embodiment of my invention, it will be apparent that changes may be made therein without departing from the intended scope and spirit of the invention. I do not therefore desire to limit myself to the foregoing except as may be pointed out in the appended claims in which I claim:

1. A brick and stone drill comprising, a shank portion and a bit portion integral therewith, said bit portion being flattened for a portion thereof, the plane of the flattened area being inclined to the longitudinal axis of the bit portion at an angle such that the flattened portion is of maximum width and depth at the extremity of said bit portion and both said width and depth decreasing from said extremity to a minimum at a point near the upper end of said bit portion, a groove in said flattened area having a maximum depth and width at the extremity of said bit portion and diminishing in width and depth substantially uniformly from such extremity to a minimum near the point where said flattened portion diminishes to a minimum the extremity of said bit portion having an internal bevel to provide an effective cutting edge representing more than one-third and less than one-half of the circumference of said extremity and in the plane of the external surface of said bit portion.

2. A brick and stone drill comprising, a shank portion and a bit portion integral therewith, said bit portion being flattened for a portion thereof, the plane of the flattened area being inclined to the longitudinal axis of the bit portion at an angle such that the flat portion is of maximum width and depth at the extremity of said bit portion and both said depth and width decreasing substantially uniformly from said extremity to a minimum at a point near the upper end of said bit portion, a groove in said flattened area having a maximum depth and width at the extremity of said bit portion and diminishing in both width and depth from such extremity to a minimum near the point where said flattened portion diminishes to a minimum, the extremity of said bit portion having an internal bevel having an angle of approximately fifty degrees with the external surface of said bit portion, to provide an effective cutting edge representing between one-third and one-half of the circumference of said extremity and in the plane of the external surface of said bit portion.

3. A brick and stone drill comprising, a shank portion and a bit portion integral therewith, said bit portion being flattened for a portion thereof, the plane of the flattened area being inclined to the longitudinal axis of the bit portion at an angle such that the flattened portion is of maximum width and depth at the extremity of said bit portion and both said width and depth decreasing from said extremity to a minimum at a point near the upper end of said bit portion, a groove in said flattened area having a maximum depth and width at the extremity of said bit portion and diminishing in depth and width substantially uniformly from such extremity to a minimum near the point where said flattened portion diminishes to a minimum, the extremity of said bit portion having an internal bevel to provide an effective cutting edge in the plane of the external surface of said bit portion.

CAMILLE L. GAIROARD.